(No Model.)

J. A. FISHER.
CAR BRAKE.

No. 473,501. Patented Apr. 26, 1892.

Witnesses
M. W. Caskey.
H. E. Harrison.

Inventor.
John A. Fisher
by his Attorney,
Wm. L. Pierce.

UNITED STATES PATENT OFFICE.

JOHN A. FISHER, OF PITTSBURG, PENNSYLVANIA.

CAR-BRAKE.

SPECIFICATION forming part of Letters Patent No. 473,501, dated April 26, 1892.

Application filed December 2, 1891. Serial No. 413,835. (No model.)

*To all whom it may concern:*

Be it known that I, JOHN A. FISHER, a citizen of the United States, residing at Pittsburg, in the county of Allegheny and State of Pennsylvania, have invented or discovered new and useful Improvements in Brake-Gears, of which the following is a specification.

Figure 1:
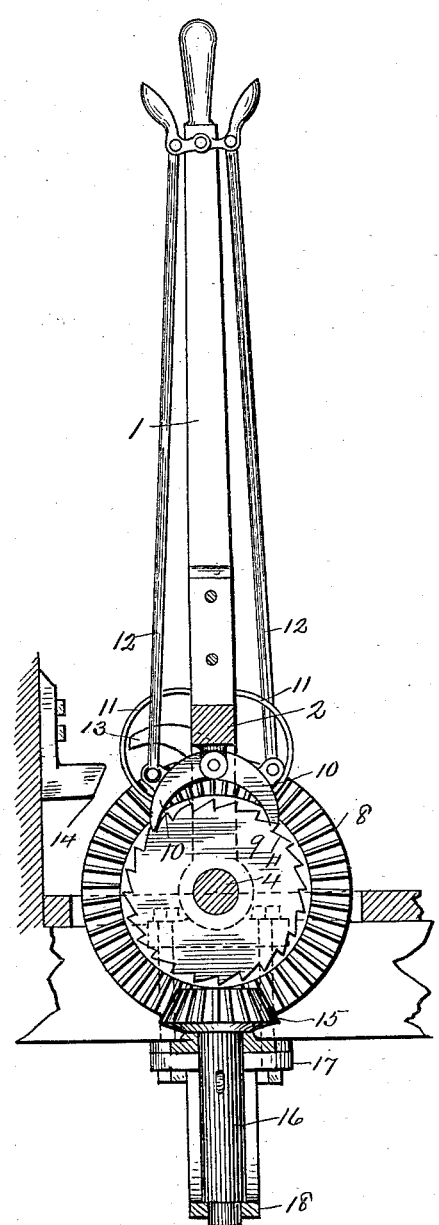
Figure 2:
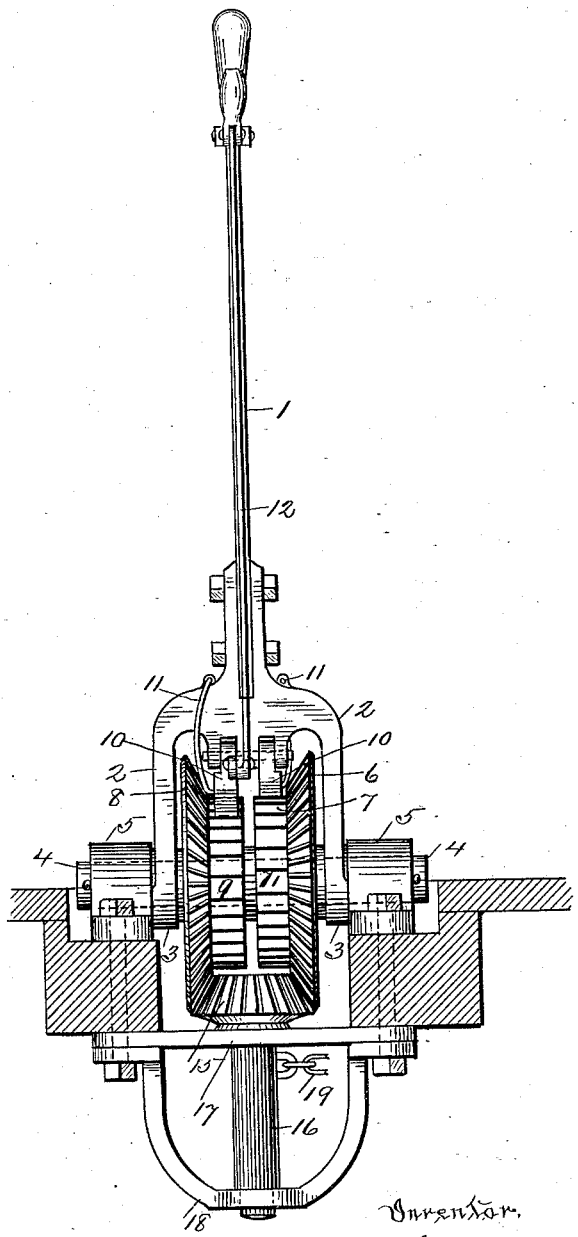

In the accompanying drawings, which make part of this specification, Figure 1 is side elevation of my brake-gear and the parts adjacent thereto, with the lower part of the yoke and the floor, &c., of the car in section. Fig. 2 is an end view of the same, with the floor of the car and its beams in section.

The purposes of my invention, generally stated, are to devise a brake-gear by which the brakes shall be wound up on both the forward and backward throw of the brake-lever, thus avoiding lost motion and winding up the brake with rapidity. I also have devised a brake-gear which is quite simple, cheap, and durable. I have also shown means by which the dogs may with certainty be released from the ratchets, even when locked firmly therein.

In the accompanying drawings, 1 is the ordinary brake-lever. At its lower end is bolted a yoke 2. At the lower ends of the yoke 2 are eyes 3 3, which turn on a shaft 4, which is in the bearings 5 5.

6 is the right-hand bevel-gear free to turn on said shaft 4, but kept from longitudinal movement by shoulders on said shaft. The inner face of said bevel-gear is formed into a ratchet-wheel 7.

8 is a bevel-gear, like the gear 6 and similarly mounted and with a like ratchet-wheel 9, except that its teeth are inclined in a direction opposite to those of the ratchet 7.

10 10 are the two dogs pivoted to the yoke 2 and engaging their respective ratchets.

11 11 are springs secured to the dogs and also to any convenient place in the yoke 2.

12 12 are the usual dog-levers for releasing the dogs. As I can apply great force to my brake, and consequently lock the dogs very firmly, I have shown the dogs provided with extending lugs 13 13, adapted to pry against any convenient fulcrum, as 14, to give additional power in releasing them. These latter devices, however, may probably be dispensed with in ordinary constructions.

15 is a pinion on the upper end of the brake-stem 16, which turns in the usual bearings 17 and 18. 19 is the chain wound on said stem, or on an enlargement of said stem, of such proportioned size as may be found desirable to quickly take up the slack.

The operation and advantages of my brake-winding mechanism will now be clearly apparent.

When the lever 1 is thrown either backward or forward, one or other of the dogs will be in constant engagement with one or other of the ratchets, thus constantly revolving one or other of the bevel-gears. The pinion 15 will thus be continuously revolved and in the same direction by the combined action of the bevel-gears. It is obvious, also, that the brake may be partially wound up, as in going down hill, and will remain set in that position, as the second ratchet and dog will prevent the brake unwinding. The relative proportions of the bevel-gears to the pinion may be changed, as required, to get the desired speed in winding up the brake; also, if it is desired to make the ratchets of larger diameters than the bevel-gears, this can be accomplished by making a mutilated ratchet, which will not strike against the pinion. The gears may be set wholly or partially below the level of the platform to give more space and also to give a longer leverage to the brake-lever.

Having described my invention, I claim—

1. The combination of a brake-stem, a pinion thereon, oppositely-moving bevel-gears meshing with said pinion, ratchets with oppositely-inclined teeth fast with their respective bevel-gears, and dogs engaging with said ratchets and moved by the backward and forward throw of the brake-lever, substantially as set forth.

2. The combination of a brake-lever, a yoke fast to the lower end of said lever, a shaft upon which said yoke turns, two dogs pivoted to said yoke, two ratchets with reverse teeth rotating upon said shaft, two oppositely-moving bevel-gears, each fast to its respective ratchet, and a pinion upon the brake-stems meshing with said gears, substantially as set forth.

In testimony whereof I have hereunto set my hand this 17th day of November, A. D. 1891.

JNO. A. FISHER.

Witnesses:
WM. L. PIERCE,
WILLIAM BEAL.